United States Patent
Anand

(10) Patent No.: US 9,160,665 B2
(45) Date of Patent: Oct. 13, 2015

(54) METHOD AND SYSTEM OF TRANSMISSION MANAGEMENT IN A NETWORK

(71) Applicant: Telefonaktiebolaget L M Ericsson (publ), Stockholm (SE)

(72) Inventor: Prashant H. Anand, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 240 days.

(21) Appl. No.: 13/870,840

(22) Filed: Apr. 25, 2013

(65) Prior Publication Data

US 2014/0321275 A1 Oct. 30, 2014

(51) Int. Cl.
*H04L 12/803* (2013.01)
*H04L 12/863* (2013.01)
*H04L 12/865* (2013.01)

(52) U.S. Cl.
CPC ............ *H04L 47/125* (2013.01); *H04L 47/625* (2013.01); *H04L 47/6255* (2013.01); *H04L 47/6275* (2013.01)

(58) Field of Classification Search
CPC ......... H04L 47/00; H04L 47/10; H04L 47/12; H04L 47/125; H04L 47/127; H04L 47/14; H04L 47/24; H04L 47/29; H04L 47/50; H04L 47/625
See application file for complete search history.

(56) References Cited

U.S. PATENT DOCUMENTS

| 6,877,049 B1 * | 4/2005 | Myers | 710/56 |
| 7,830,796 B2 * | 11/2010 | Chen et al. | 370/230.1 |
| 7,853,739 B1 * | 12/2010 | Kupershmidt et al. | 710/60 |
| 8,923,157 B2 * | 12/2014 | Das et al. | 370/253 |
| 2008/0097887 A1 * | 4/2008 | Duquette et al. | 705/37 |
| 2010/0017548 A1 * | 1/2010 | Iwahashi et al. | 710/56 |
| 2013/0070584 A1 * | 3/2013 | Hutchison et al. | 370/216 |
| 2013/0107711 A1 * | 5/2013 | Kessler et al. | 370/235 |
| 2014/0121898 A1 * | 5/2014 | Diab | 701/36 |

OTHER PUBLICATIONS

"IEEE Std 802.3az™-2010, Part 3: Carrier Sense Multiple Access with Collision Detection (CSMA/CD) Access Method and Physical Layer Specifications", Amendment 5: Media Access Control Parameters, Physical Layers, and Management Parameters for Energy Efficient Ethernet, 2010, 264 pages.
Anand, Prashant H., et al., "Queue Monitoring to Filter the Trend for Enhanced Buffer Management and Dynamic Queue Threshold in 4G IP Network/Equipment for Better Traffic Performance", U.S. Appl. No. 13/650,830, filed Oct. 12, 2012, 37 pages.
Christensen, K., et al., "IEEE 802.3az: The Road to Energy Efficient Ethernet", Department of Computer and Information Science (IDA), Linköpings universitet, Sweden, Apr. 2, 2012, 32 pages.

* cited by examiner

*Primary Examiner* — Chi H Pham
*Assistant Examiner* — Weibin Huang
(74) *Attorney, Agent, or Firm* — Nicholson De Vos Webster & Elliott LLP

(57) ABSTRACT

A method implemented in a network for enhancing transmission is disclosed. The network contains a number of network devices, and at least one network device provides traffic scheduling function to schedule transmission of packets. The method starts with arrival of a packet. In response to arrival of the packet, the network device determines whether a timer has expired, whether a congestion level has reached a congestion threshold, whether the packet is a high priority packet, and whether a burst accumulation counter has reached an accumulation threshold. The packet is transmitted, along with any packet waiting for transmission, in response to at least one of the conditions are satisfied: the timer has expired, the congestion level has reached the congestion threshold, the packet is a high priority packet, and the burst accumulation counter has reached the accumulation threshold.

19 Claims, 6 Drawing Sheets

US 9,160,665 B2

METHOD AND SYSTEM OF TRANSMISSION MANAGEMENT IN A NETWORK

FIELD OF INVENTION

The embodiments of the invention are related to the field of traffic management. More specifically, the embodiments of the invention relate to a method and system to manage traffic transmission in a network.

BACKGROUND

Today Ethernet is the dominant computer networking technology. As Ethernet gains wide popularity among enterprise, carriers, and cloud service providers, energy consumption by Ethernet based systems becomes an important concern. In an Ethernet based system, the majority of Ethernet transmission channels spend significant time waiting for data packets. Worse, during idle periods, Ethernet transmission channels still consume power at near full active levels because of clock synchronization requirements during those idle periods.

Concerning power consumption of legacy Ethernet equipment, two important facts have been observed:

(a). Consumption increases with the transmission channel speed. This is due to the increased hardware complexity that is required to achieve higher speeds;

(b). Consumption is mostly maximum and does not necessarily depend on the traffic load because of the continuous transmission of physical layer signaling in the absence of user data. This signaling is mandatory to keep the receivers aligned to the channel conditions.

In order to address Ethernet power consumption issue, the Energy Efficient Ethernet (EEE), sometimes referred to as Green Ethernet, is proposed. EEE is a set of enhancements to the twisted-pair and backplane Ethernet family of networking stands that allow for less power consumption during period of low data activity. The intention is to reduce power consumption by 50% or more without impacting the vital function that these network interfaces perform in a communication infrastructure. For example, the Institute of Electrical and Electronics Engineers (IEEE), through the IEEE 802.3az task force, has developed a set of standards for the effort. Yet, the mechanism and standard proposed have deficiency in transmission efficiency that should be improved.

SUMMARY

A method implemented in a network for enhancing transmission is disclosed. The network contains a number of network devices, and at least one network device provides traffic scheduling function to schedule transmission of packets. The method starts with arrival of a packet. In response to arrival of the packet, the network device determines whether a timer has expired, whether a congestion level has reached a congestion threshold, whether the packet is a high priority packet, and whether a burst accumulation counter has reached an accumulation threshold. The packet is transmitted, along with any packet waiting for transmission, in response to at least one of the conditions are satisfied: the timer has expired, the congestion level has reached the congestion threshold, the packet is a high priority packet, and the burst accumulation counter has reached the accumulation threshold.

A network device serving as a traffic scheduler of a network to schedule transmission of packets is disclosed. The network device contains a traffic transceiver module configured to receive and transmit packets. It contains a traffic buffer configured to store packets waiting for transmission. It also contains a scheduling processor configured to schedule transmission of a received packet. The scheduling processor contains a scheduler register configured to trigger transmission of the received packet along with the packets stored in the traffic buffer when the scheduler register is set to be on. It further contains: a timer configured to time a duration, where an expiration of the timer triggers the scheduler register turning on; a congestion determinator configured to determine whether a congestion level reaches a congestion threshold, where a determination that the congestion level has reached the congestion threshold triggers the scheduler register turning on; a traffic priority determinator configured to determine whether the received packet is a high priority packet, wherein a determination that the received packet is a high priority packet triggers the scheduler register turning on; a burst accumulation counter configured to determine whether a burst accumulation counter has reached an accumulation threshold with the received packet included, wherein a determination that the burst accumulation counter has reached the accumulation threshold triggers the scheduler register turning on; and a database configured to store values of the congestion threshold and the accumulation threshold.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
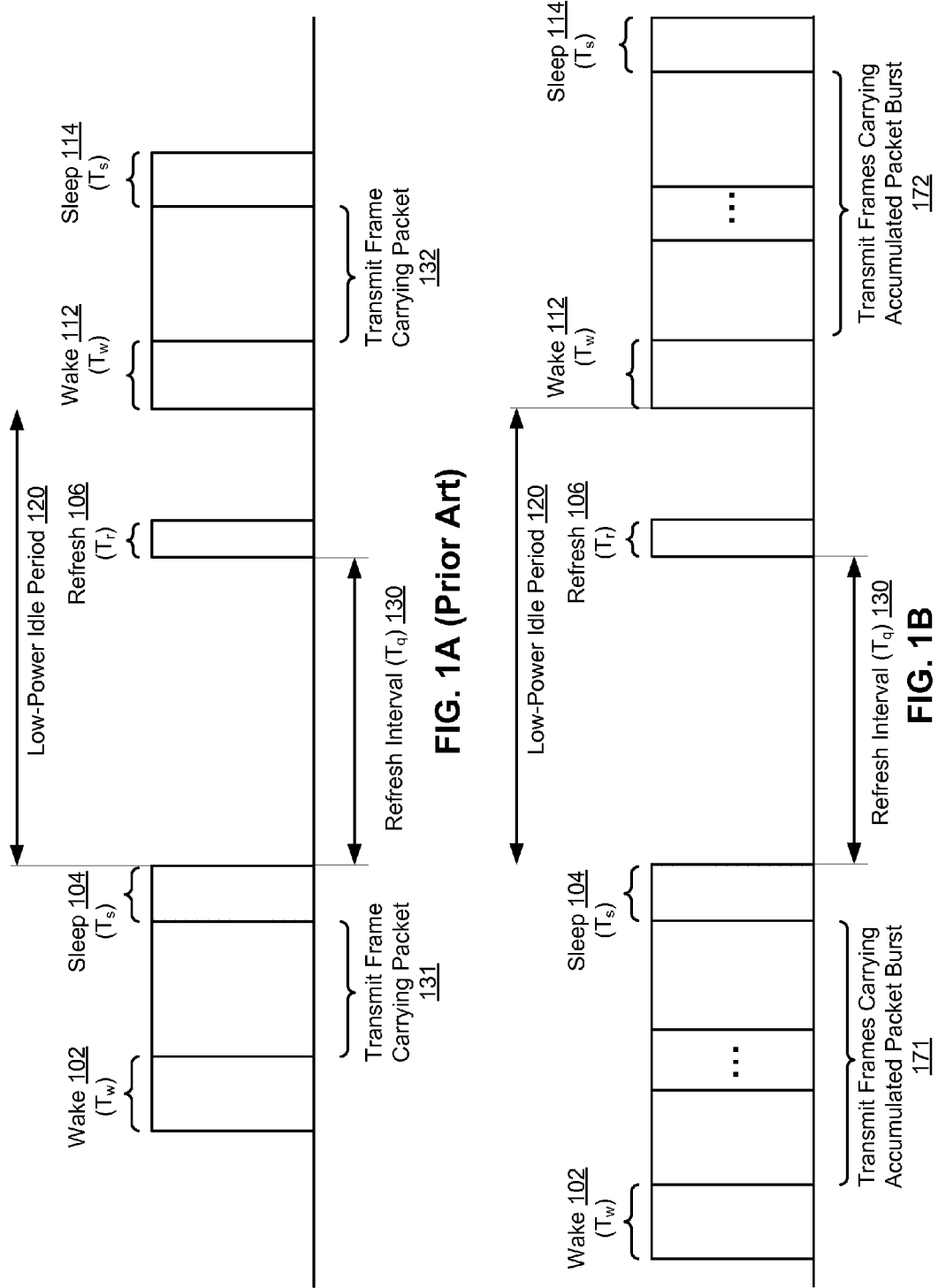
FIG. 1A illustrates the operations of transmission in an Energy Efficient Ethernet system for sporadic transmission.
FIG. 1B illustrates the operations of packet burst accumulation for sporadic transmission according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In a network, numerous network devices are communicatively coupled to transmit and receiving traffic. Traffic can be of a variety of formats and comply with a variety of protocols. For Ethernet based network, traffic is transmitted through Ethernet frames (or simply referred to as frames). Frames carry traffic from OSI (Open Systems Interconnection) upper layers. For simplicity of discussion, upper layer traffic is referred to as packets, and packets can be of many different formats including IP packets. Ethernet frames are transmitted through various transmission channels, such as a radio frequency channel (wireless), a copper line, a power line, and other suitable medium for communication (e.g., fluid, gas, or solid molecule vibration or motion), depending on implementation.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

An Ethernet transmitter of a network device transmits frames continuously. When there is no data, they transmit an auxiliary signal called IDLE that is used to keep transmitters and receivers aligned and synchronized. The approach of Energy-Efficient Ethernet (EEE) is to limit transmission to short periodic refresh intervals to maintain alignment between a transmitter and a receiver when there is no data to transmit. For example, IEEE 802.3az standard defines mechanisms to stop transmission when there is no data to send, and to resume transmission quickly when a new packet arrives by introducing a low-power idle mode (sometimes referred to as sleep mode).

The power consumption while in the low-power idle mode is expected to be much lower (typically as low as 10%) than the power consumption in the active mode. The energy efficient of EEE is a function of transmission channel utilization, packet transmission time, and the distribution of packet inter-arrival times. In the best-case scenario, a large block of packets (a burst) is sent back-to-back, and the EEE overhead is small in comparing to the overall transmission time of the burst. In the worst-case scenario, small packets are sent sporadically with a gap between them. In that case, every packet will have an overhead of going into and coming out of the low-power idle mode. In many applications, transmission channel utilization of Ethernet transmission channels is not high, and sporadic transmission is common FIG. 1A illustrates the operations of transmission in an Energy Efficient Ethernet system for sporadic transmission. In the figure, the following times are defined:

$T_w$: Denotes a wake-up period, that is, the time required to exit the low-power idle mode, and to bring an Ethernet transmission channel ready for transmission.

$T_s$: Denotes a sleep period, that is, the time needed to enter the sleep (low-power idle) mode, for instance, after the transmission of the last frame.

$T_q$: Denotes a maximum period with no transmission. After a $T_q$ with no activity, a refresh period $T_r$ is needed.

$T_r$: Denotes a short refresh period, that is, the refresh signaling period necessary to keep the receivers aligned.

Referring to FIG. 1A, an Ethernet transmitter is idle at the beginning. A packet arrives for transmission. Through wake 102 (a wake-up period), the transmitter gets ready to transmit. A packet then is embedded in a frame, and during the period reference 131, the frame carrying the packet is transmitted. Then the transmitter goes back to a sleep period at sleep 104. After refresh interval 130, a refresh frame is processed during refresh period 106. The transmitter stays in a low-power idle period during reference 120. Then another packet arrives, and the Ethernet transmitter goes through wake 112 (another wake-up period), and transmit during reference 132, another frame carrying the new packet. Then the transmitter returns to idle through the sleep period at reference 114.

The approach above as disclosed in IEEE 802.3az for EEE is not as efficient as it was originally expected because the wake-up and sleep-down period are too large in comparison to the frame transmission time upon sporadic transmissions. The efficiency issue is illustrated below.

One may denote the following:

N=Transmission Efficiency $T_{frame}$=User Data/frame Transmission time.

For a sporadic transmission (one frame at a time), we have:

$$N=(T_{frame})/(T_w+T_{frame}+T_s) \quad (1)$$

$T_{frame}$ refers to Ethernet frame transmission time ([frame size+interframe gap (IFG)+start frame delimiter (SFD)+preamble] divided by transmission channel (link) rate). Thus formula (1) gives the percentage of time spent on actual data transmission per wake-transmission-sleep cycle.

From formula (1), it can be observed that EEE is not efficient in scenarios where the traffic load is low and the average frame size is small. That is, with $T_w$ and $T_s$ staying the same, a small $T_{frame}$ results in a low transmission efficiency. Yet, large power saving may be achieved if a group of frames are transmitted together (e.g., back-to-back) carrying a bulk of packets (a packet burst). In this way, the transmission channel is only awaken for a transmission of a large portion of data, hence the cost of waking up and sleeping down a transmission channel is shared among the group of frames, and it can greatly improve transmission efficiency.

FIG. 1B illustrates the operations of packet burst accumulation for sporadic transmission according to one embodiment of the invention. FIG. 1B is similar to FIG. 1A, and the same or similar references indicate same or similar time periods. The differences in FIG. 1B, in comparing to FIG. 1A, are the transmissions of frames carrying traffic. At reference 171, instead of transmitting a single frame, a group of frames carrying a set of accumulated packets (referred to as accumulated packet burst), is transmitted. A similar transmission occurs at reference 172.

Note that even though FIG. 1A illustrates single frames at references 131 and 132 respectively, multiple frames can be transmitted at references 131 and 132. However, in FIG. 1A, there is no packet accumulation and packets are transmitted in frames as they arrived. In FIG. 1B, a system purposefully accumulates incoming packets, and then transmits a list of packets as a single packet burst through Ethernet frames.

One may denote $T_{burst}$ to be the time takes to transmit a group of frames (referred to as a "burst"). $T_{burst}=M \times T_{frame}$, where M denotes the number of frames within the group. Then the transmission efficiency, denoted as N', of the new approach is the following:

$$N'=T_{burst}/(T_w+T_{burst}+T_s) \quad (2)$$

The efficiencies of the two approaches can be compared using examples. For a 10 Gbps Ethernet, typical time periods for various parameters are the following:
$T_w$ (wake up time)=4.48 μsec
$T_s$ (sleep time)=2.88 μsec
$T_{packet\_size\_1500}$ (transmission time for data packet of size 1500 Bytes)=1.2 μsec
$T_{packet\_size\_64}$ (transmission time for data packet of size 64 Bytes)=0.0512 μsec For a sporadic transmission (one frame at a time) utilizing EEE techniques, the transmission efficiency for a packet of 1500 bytes is:

$$N=(T_{packet\_size\_1500})/(T_w+T_{packet\_size\_1500}+T_s)=1.2/(4.48+1.2+2.88)=14.01\%$$

The transmission efficiency for a packet of 64 bytes is:

$$N=(T_{packet\_size\_64})/((T_w+T_{packet\_size\_64}+T_s)=0.0512/(4.48+0.0512+2.88)=0.69\%$$

For the same packets utilizing EEE techniques enhanced with packet burst accumulation, the transmission efficiency for packets of 1500 bytes with a burst size of 10 packets is:

$$N' = T_{packet\_size\_1500\_burst} / (T_w + T_{packet\_size\_1500\_burst} + T_s)$$
$$= (10 \times 1.2)/(4.48 + 10 \times 1.2 + 2.88) = 61\%$$

Similar, the transmission efficiency for packets of 64 bytes with burst size of 10 packets is:

$$N' = T_{packet\_size\_64\_burst} / (T_w + T_{packet\_size\_64\_burst} + T_s)$$
$$= (10 \times 0.0512)/(4.48 + 10 \times 0.0512 + 2.88) = 6.5\%$$

Thus, as illustrated, EEE techniques enhanced with packet burst accumulation is more efficient. Embodiments of the invention may set a burst accumulation threshold. Prior to transmitting a packet through Ethernet frames, a burst accumulation counter keeps counting the number of packets has been accumulated for transmission. If the counter has not reached the burst accumulation threshold, the incoming packet is accumulated with any existing packet in waiting for transmission. When an incoming packet triggers the burst accumulation counter to reach the burst accumulation threshold, a packet burst has completed accumulation, and all the packets within the packet burst are then transmitted to an EEE port. Thus, the packet burst accumulation will achieve efficiency illustrated in FIG. 1B. Note that a burst accumulation counter is for one transmission port, thus a network device with multiple transmission ports may contain multiple burst accumulation counters, and each counter may have a different accumulation threshold. In addition, the burst accumulation threshold may be adjustable. The adjustment may be dynamic, based on network conditions, status of transmission, status of buffers, and other factors.

Packet burst accumulation by itself improves transmission efficiency on Ethernet transmission channels. However, transmission efficiency is often not the only consideration in searching for an optimal transmission. Clients of a network often have service level agreements (SLAs) with an operator of the network. In order to comply with a SLA, the network is mandated to deliver traffic of a client within a certain time frame. By definition, packet burst accumulation delays traffic transmission. Thus, the objective of achieving transmission efficiency is preferably balanced with the objective of sending traffic as quickly as required.

In some embodiments of the invention, the network device contains one or more timers to keep track of the time packets have been waiting for transmission. The timer may be started to count after a received packet is stored in waiting for transmission in one embodiment. In another embodiment, the timer may start to count an absolute time after an event (for example, completion of the last transmission). The timer contains a duration, expiration of which triggers packets in waiting to be transmitted. The timer duration may be configurable based on a SLA, a customer requests, operator preferences, network conditions, or other factors.

Within a network, some packets are marked as high priority traffic as they transmit through the network. For examples, packets for real-time video application is generally considered a high priority traffic, and a transmitter needs to send the packets as quickly as it can, even if sending a single real-time video packet by itself is wasteful with regarding to transmission efficiency. A packet may be marked as high priority in its packet header, so that a network device may identify it as high priority once the packet is dissembled and reassembled for transmission. A packet may be identified as high priority based on other criteria, for example, based on the source or destination addresses of the packet, as the source/destination addresses are associated with a SLA demanding quick transmission. Or a packet is considered as high priority based on a traffic type indication within the header of the packet. The transmitter will send the identified high priority packet to the transmission port, along with any packet already accumulated in a packet burst waiting for transmission. In one embodiment, the high priority packet will be transmitted first, ahead of any other packets within the packet burst.

In some scenarios, packets stored in a network device need to be transmitted without waiting for a completion of burst accumulation, not due to an incoming packet indicates a priority, but due to a congestion condition at the network device. For example, network device generally stores packets waiting for transmission in one or more buffers. Each buffer may contain one or more queues (e.g., one queue for each destination). A network device may come to a state where packets arrive at the queues for buffering quicker than packets leave the queues for transmission. In other words, the network device has one or more congested buffers. When a network device is congested, the transmitter of the network device preferably transmits packets out to alleviate the situation. Thus, in one embodiment of the invention, the network device sets a congestion threshold. The congestion level of buffers within the network device is monitored, if the congestion level reaches a threshold level, the transmitter of network device will transmit all the packets within the one or more congest buffers.

In some embodiments, the congestion threshold is configurable and dynamically adjustable, the dynamic adjustment can be based priorities of packets and other factors, see for example U.S. patent application Ser. No. 13/650,830, entitled "Queue Monitoring to Filter The Trend for Enhanced Buffer Management and Dynamic Queue Threshold in 4G IP Network/Equipment for Better Traffic Performance," incorporated by reference herein.

Figure 2:
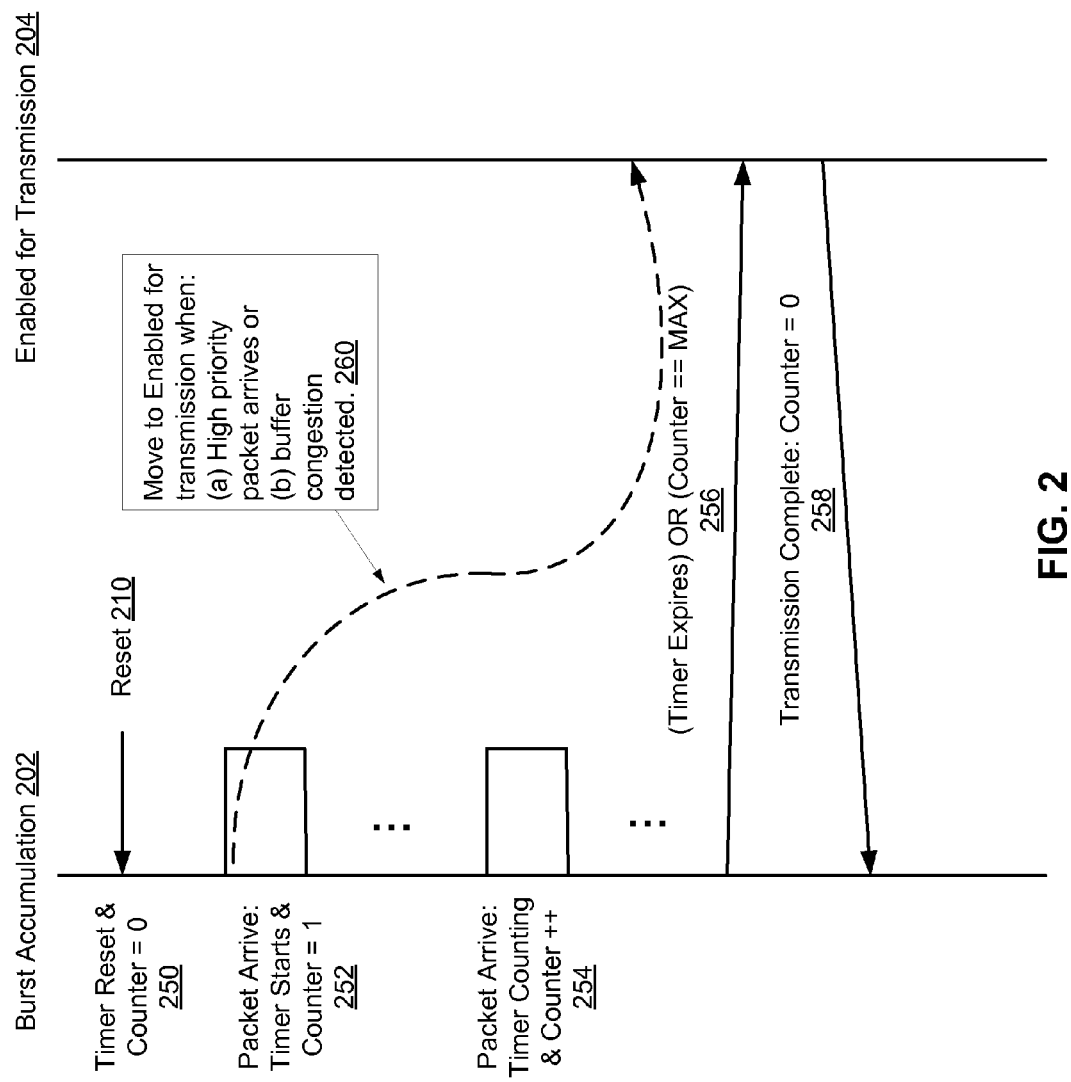
FIG. 2 illustrates the operations of enhanced frame transmission according to one embodiment of the invention.

FIG. 2 illustrates the operations of enhanced frame transmission according to one embodiment of the invention. Referring to FIG. 2, a transmitter of a network device contains at least two modes. One mode is "burst accumulation" at reference 202, where the transmitter does not transmit for a set of packets (e.g., the set of packets for a transmission port). The other mode is "enabled for transmission" at reference 204.

At reference 210, the transmitter is reset. The reset causes a timer and a counter (i.e., a burst accumulation counter) reset to zero at reference 250. The timer and counter stay inactive until a packet arrive at reference 252. The arrival of the packet triggers the timer to run and counter starts to count to one. Then the timer will keep running, while the count counts upon a packet arrives at reference 254. Upon the timer expires or the counter reaches an accumulation threshold (denoted as MAX) at reference 256, the transmitter moves from "burst accumulation" mode to "enabled for transmission" mode. The transmitter then transmits packets in waiting for transmission. If one or more new packets arrive at the transmitter while the transmitter at "enabled for transmission" mode, the one or more new packets are transmitted along with the existing packets in waiting. Once all the packets are transmitted, the transmitter moves from "enabled for transmission" mode back to "burst accumulation" mode at reference 258. At the time, the transmitter is at a state similar to reset 210.

While packets are arriving for transmission at references 252 and 254, the network device keeps monitors for the arrival of high priority packet and keeps checking buffer congestion status. If a high priority packet has arrived, or the buffer congestion level has reached a congestion threshold, the transmitter moves from "burst accumulation" mode to "enabled for transmission" mode at reference 260, even if the timer has not expired nor the counter has reached the accumulation threshold. The transmitter then starts to transmit packets in waiting for transmission. If one or more new packets arrive at the transmitter while the transmitter at "enabled for transmission" mode, the one or more new packets are transmitted along with the existing packets in waiting. Once all the packets are transmitted, the transmitter moves from "enabled for transmission" mode back to "burst accumulation" mode at reference 258. At the time, the transmitter is at a state similar to reset 210.

Figure 3:
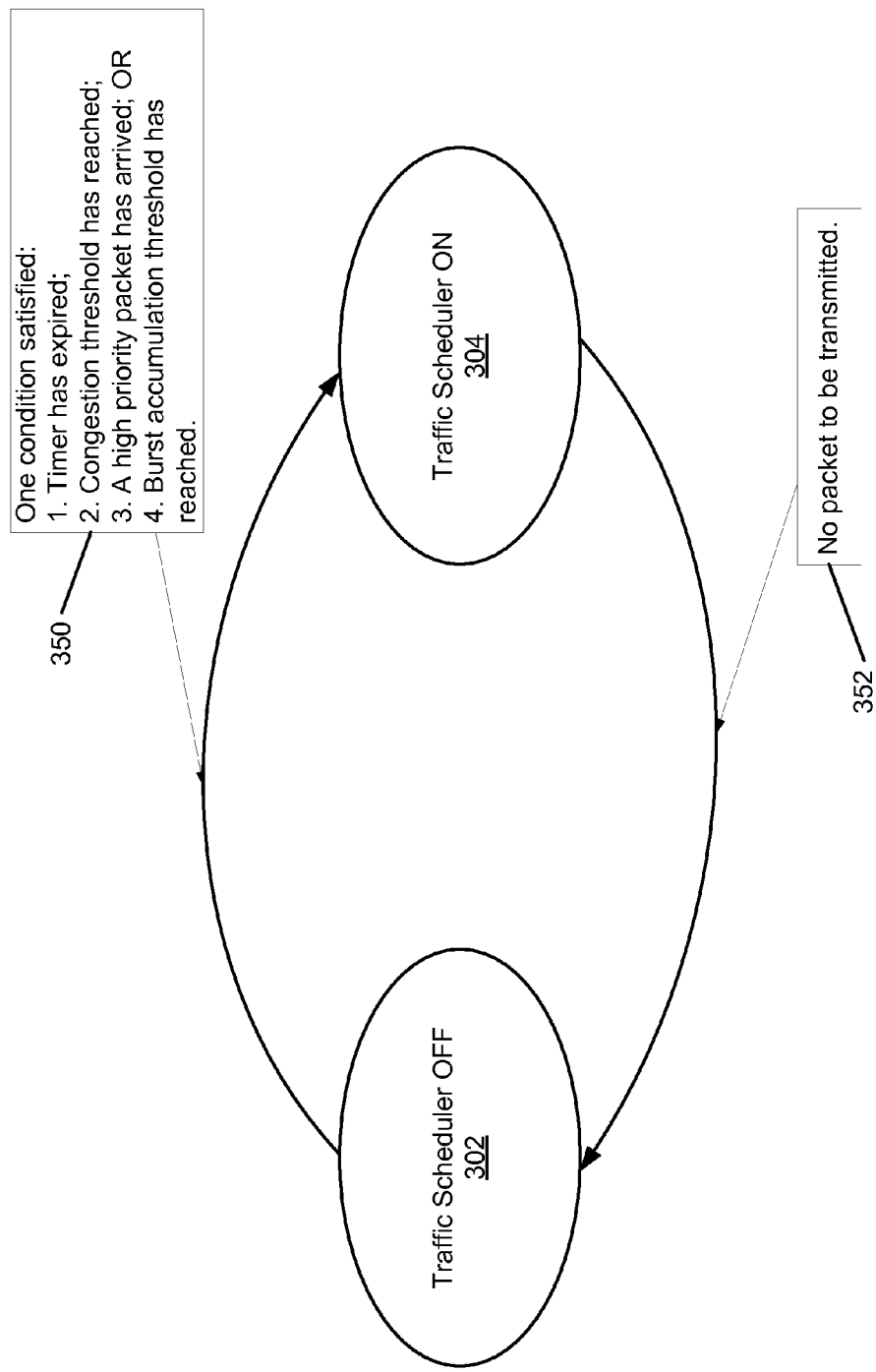
FIG. 3 illustrates state machine transitions of a traffic scheduler according to one embodiment of the invention.

FIG. 3 illustrates state machine transitions of a traffic scheduler according to one embodiment of the invention. In one embodiment, the transmission of an Ethernet transmitter is coordinated by a traffic scheduler. The traffic scheduler can be a module of a network device containing the Ethernet transmitter, or a standalone network device communicatively coupled to the network device containing the Ethernet transmitter. When the traffic scheduler is in an OFF state at reference 302, no packet is transmitted through the transmitter. On the other hand, when the traffic scheduler is in an ON state at reference 304, all packets in waiting for transmission will be transmitted.

The transition of traffic scheduler from OFF state to ON state occurs at reference 350 when at least one of the four conditions are satisfied:

(1). A timer associated with the transmitter has expired;
(2). A congestion level of the network device storing packets in waiting has reached a congestion threshold;
(3). A high priority packet has arrived for transmission; or
(4). A burst accumulation counter has reached a burst accumulation threshold.

In the opposite direction, the transition of traffic scheduler from ON state to OFF state occurs at reference 352 when the transmitter no longer has packet to be transmitted.

Note the embodiments of the invention increase transmission efficiency. The increased transmission efficiency reduces energy usage at an Ethernet transmitter implementing embodiments of the invention. Further, because the frames are now transmitted in burst through Ethernet transmission channels, the Ethernet receiver at the remote site also gain the benefits of this invention as it now can process frames/packets received in burst. Also note, the benefits of "bursty transmission" is not limited to ones related to reducing energy usage. Other possible benefits include increasing transmission channel efficiency thus more transmitter may traffic flows may be aggregated in a given transmission channel.

Figure 4:
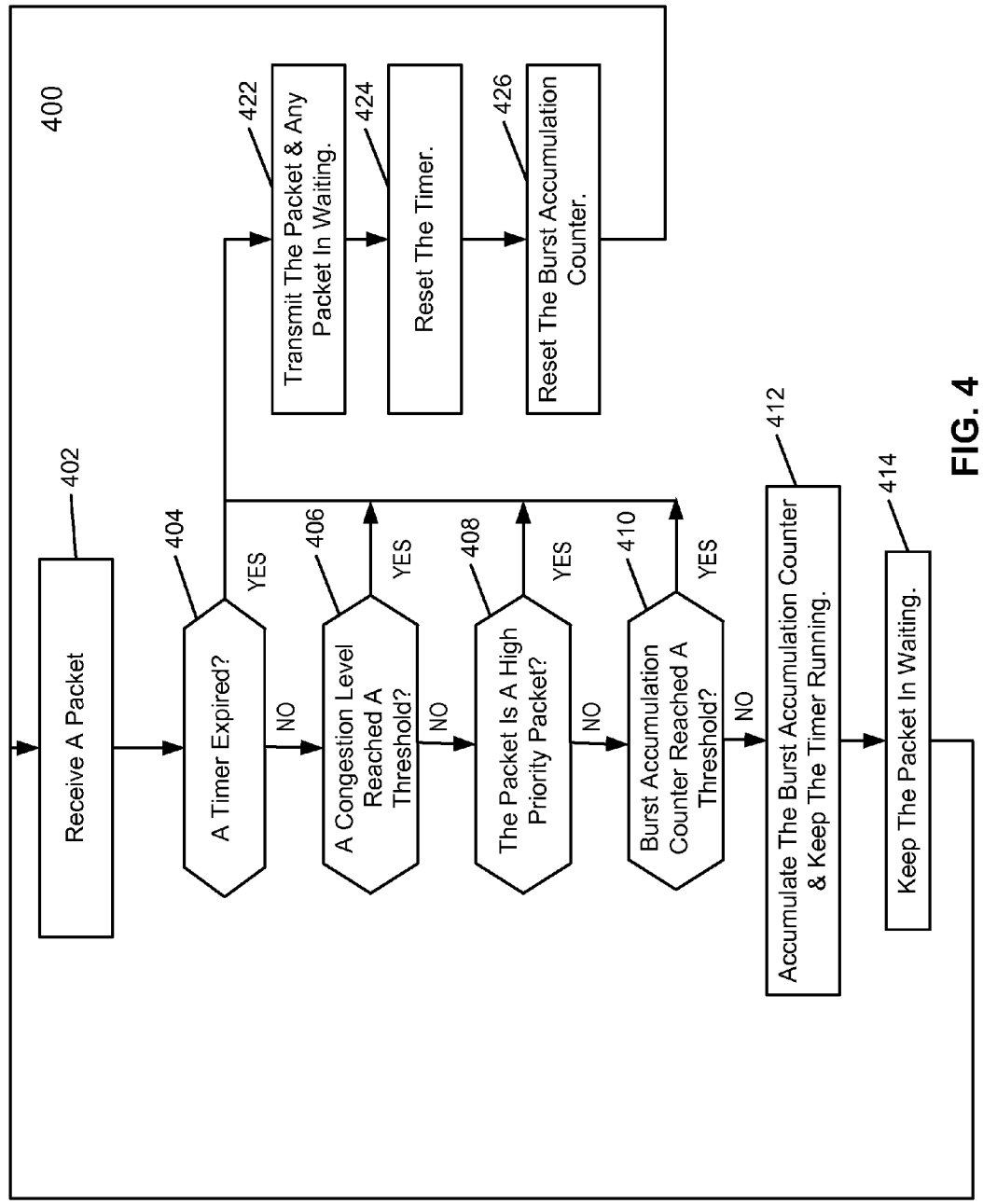
FIG. 4 is a flow diagram illustrating the enhanced traffic transmission method according to one embodiment of the invention.

FIG. 4 is a flow diagram illustrating the enhanced traffic transmission method according to one embodiment of the invention. Method 400 can be implemented in a network device, particularly at or around a transmitter of the network device. For example, the method may be implemented in a traffic scheduler for the transmitter. The method starts with block 402, where a packet is received for transmission at the traffic scheduler of the network device. Instead of forwarding the packet for transmitting over an Ethernet frame right away, the traffic scheduler performs a series of operations below.

At block 404, the traffic scheduler determines if a timer associated with the transmitter has expired. If the timer has expired, it indicates that the transmitter needs to transmit immediately, and the flow goes to block 422, where the transmitter transmits the packet and any packet in waiting for transmission. Then the timer is reset at block 424, and a burst accumulation counter associated with the transmitter is reset at block 426. The timer keeps track of the period of time packets have been waiting for transmission while the burst accumulation counter keeps track of the number of packets have been accumulated in waiting for transmission. Since the packets in waiting have been transmitted at block 422, the timer and the burst accumulation counter are reset at blocks 424 and 426. Then the traffic scheduler returns to block 402 and waiting for a new packet to arrive for transmission. Note the timer can be configurable. In one embodiment, the timer can be dynamically adjusted based on network conditions, status of transmission, status of buffers, and other factors.

If the timer associated with the transmitter has not expired, the flow goes to block 406, where the traffic scheduler determines whether a congestion level has reached a congestion threshold. The congestion level is associated with the transmitter, which contains one or more buffers to store packets. The congestion level can be monitored continuously and compare to the congestion threshold that is dynamically adjustable, see for example U.S. patent application Ser. No. 13/650,830, entitled "Queue Monitoring to Filter The Trend for Enhanced Buffer Management and Dynamic Queue Threshold in 4G IP Network/Equipment for Better Traffic Performance," incorporated by reference herein. If the congestion level has reached the congestion threshold, the flow goes to block 422, where the transmitter transmits the packet and any packet in waiting for transmission. Then the timer is reset at block 424, and a burst accumulation counter associated with the transmitter is reset at block 426. Then the traffic scheduler returns to block 402 and waiting for a new packet to arrive for transmission.

If the congestion level has not reached the congestion threshold, the flow goes to block 408, where the traffic scheduler determines whether the packet is a high priority packet. The priority of the packet may be determined by a variety of factors, such as information within the header of the packet (source and destination addresses, packet type and priority indication), the arriving port, or other factors. Once the packet is identified as a high priority packet, the flows goes to the same blocks 422-426 sequences and the traffic scheduler returns to block 402 and waiting for a new packet to arrive for transmission.

If the packet is not identified as a high priority packet at block 408, the flow goes to block 410, where the traffic scheduler determines whether a burst accumulation counter has reached an accumulation threshold. The accumulation threshold is associated with the transmitter of the network device, and a network device may contain a number of accumulation thresholds. The accumulation threshold indicates how many packets are to be accumulated to complete a packet burst before the transmitter transmits the packet burst. The accumulation threshold is configurable in one embodiment. The burst accumulation counter counts each packet when it's forwarded toward the transmitter in waiting for transmission. If the burst accumulation counter has reached the burst accumulation threshold after adding the packet, the flows goes to the same blocks 422-426 sequences and the traffic scheduler returns to block 402 and waiting for a new packet to arrive for transmission.

If the burst accumulation counter has reached the burst accumulation threshold, the flows goes block 410, where the traffic scheduler accumulates the burst accumulation counter and keeps the timer running. Then the traffic scheduler keeps the packet in waiting for transmission, and the traffic scheduler returns to block 402 and waiting for a new packet to arrive for transmission.

Note even though the blocks are illustrated in a single sequence, a variety of other sequences are possible. For example, blocks 404-410 may be implemented in any order among themselves. Similarly, the order between blocks 412-414, and the order between blocks 424-462 can be reversed. Other permutations of operation sequences are feasible and even preferable depending on implementation. The variety of permutations is obvious to person in the ordinary skills in the art following the principle disclosed within.

Method 400 increases transmission efficiency and thus reduces energy usage at an Ethernet transmitter implementing embodiments of the invention. It can be used in a network where Ethernet frame transmission complies with IEEE 802.3az standards for Energy-Efficient Ethernet. It may be used in other networks not focusing on energy usage too.

Network Devices Implementing Enhanced Frame Transmission Methods

Figure 5:
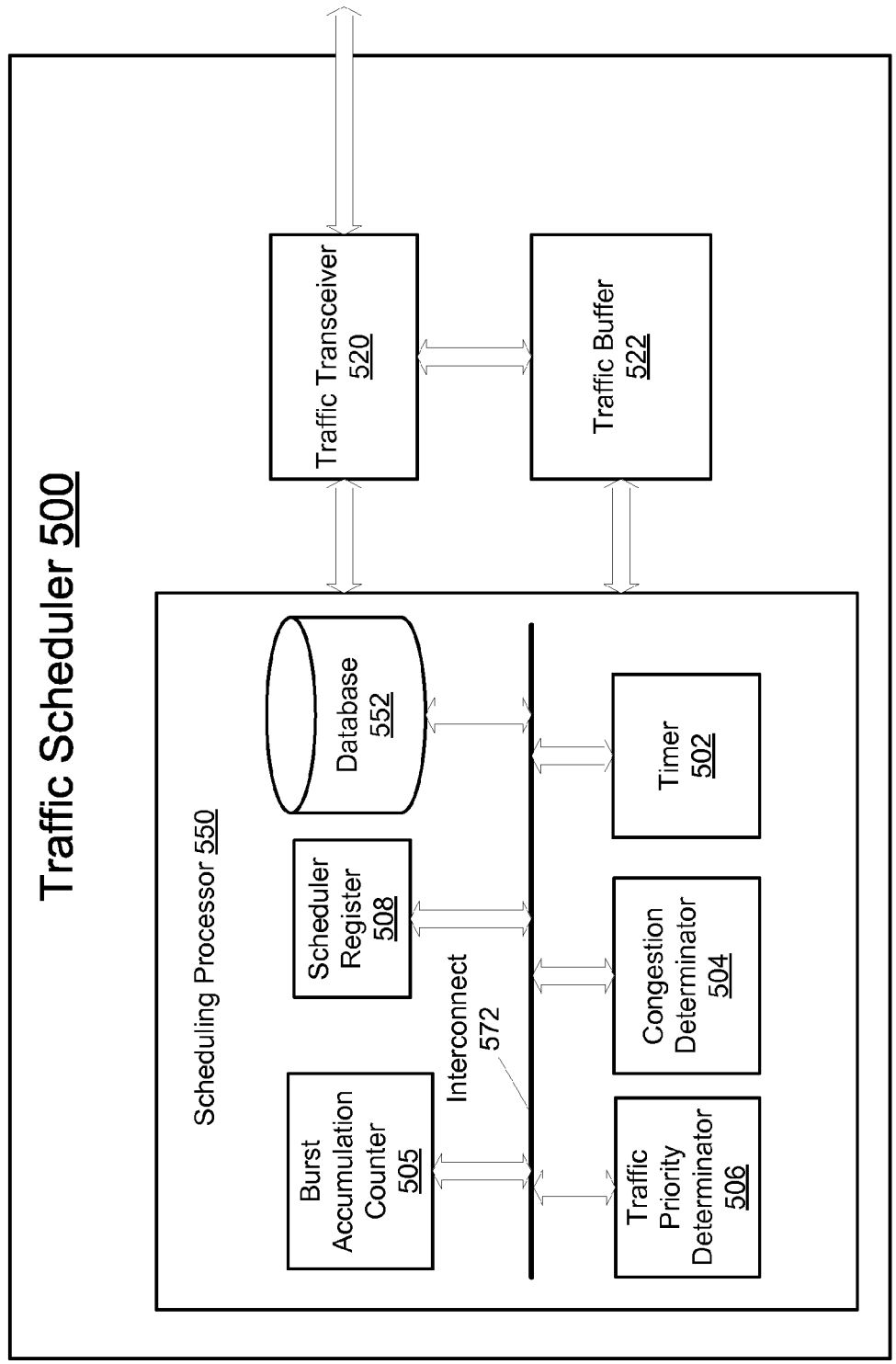
FIG. 5 is a block diagram illustrating a network device implementing a method of enhanced traffic transmission according to one embodiment of the invention.

FIG. 5 is a block diagram illustrating a network device implementing a method of enhanced traffic transmission according to one embodiment of the invention. The network device serves as traffic scheduler. Traffic scheduler 500 contains a scheduling processor 550, which may be a standalone processor or a part of a processor within a traffic scheduler embedded within or communicatively coupled with a network device containing an Ethernet transmitter. When scheduling processor 550 is a part of a larger processor, it may have dedicated network processor unit (NPU) or share processing unit with other application.

Scheduling processor 550 may contain timer 502, congestion determinator 504, traffic priority determinator 506, burst accumulation counter 505, scheduler register 508, and database 552. These various modules are interconnected through interconnect 572. Note that various modules can be implemented as a single unit or multiple units, the unit or units integrate various modules and perform similar function as the modules of scheduling processor 550, and these modules can be implemented in software, hardware or a combination thereof. In addition, some modules illustrated in FIG. 5 may be implemented outside of scheduling processor 550 but communicatively coupled with scheduling processor 550.

Traffic transceiver 520 is configured to receive traffic of the network that traffic scheduler 500 is in. The received traffic is forwarded to scheduling processor 550 to be scheduled for transmission. The received traffic may take the form of packets in a variety of different formats. Traffic buffer 522 is configured to store traffic waiting for transmission. Traffic buffer 522 main contain one or more queues within (not shown), where one queue is for one set of packet sharing one common characteristic. Once it is determined that traffic shall be transmitted, based on scheduler register 508 being set to ON, and the traffic is forwarded to traffic transceiver 520 for transmission to a transmission channel.

Within scheduling processor 550, timer 502 is configured to keep track of time once it is reset/initiated. If and when Timer 502 expires, scheduler register 508 is set to ON. Congestion determinator 504 is configured to monitor congestion status of traffic buffer 522, and a congestion is detected via a determination that a congestion level of one or more queues within buffer 522 is over a congestion threshold. Once a congestion is detected, scheduler register 508 is set to ON. The congestion threshold is stored in database 552.

Also within scheduling processor 550, traffic priority determinator 506 is configured to determine priority of packets. Once a high priority packet is identified, the scheduler register 508 is set to ON. Burst accumulation counter 505 is configured to count the number of packets accumulated waiting for transmission at transfer buffer 522. If and when the burst accumulation counter has reached an accumulation threshold, scheduler register 508 is set to ON. The accumulation threshold is stored in database 552. Scheduler register 508 is configured to include at least states of ON and OFF. When the scheduler register 508 is set to ON, traffic stored in traffic buffer 522 is forwarded to traffic transceiver 520 for transmission. When the scheduler register 508 is set to OFF, received packets are queued in traffic buffer 522, in waiting for being transmitted.

In one embodiment, packets are forwarded to traffic scheduler 500 and received at traffic transceiver 520. The received packets are forwarded to scheduling processor 550. An incoming packet increases counting at burst accumulation counter 505, and the incoming packet will also keep timer 502 running. If burst accumulation counter 505 has reached an accumulation threshold stored in database 552, scheduler register 508 is set to ON. Similarly, if timer 502 has expired, where an expiration time duration is also stored in database 552, scheduler register 508 is set to ON. In addition, scheduler register 508 is set to ON if traffic priority determinator 506 identifies a high priority packet in need of immediate transmission through, or congestion determinator 504 detects a congestion at traffic buffer 522 by determining that a congestion level is over a congestion threshold stored in database 552. If scheduler register 508 is not set to ON, the incoming packet will be forwarded to traffic buffer 522 in waiting for transmission.

Once scheduler register 508 is set to ON, all packets within traffic buffer 522 will be transmitted through traffic transceiver 520. Any packet that is ready to transmit while traffic transceiver 520 is transmitting will also be transmitted along with packets in traffic buffer 522. Once the transmission completes, scheduler register 508 is set to OFF, and timer 502 and burst accumulation counter 505 are reset to zero.

Figure 6:
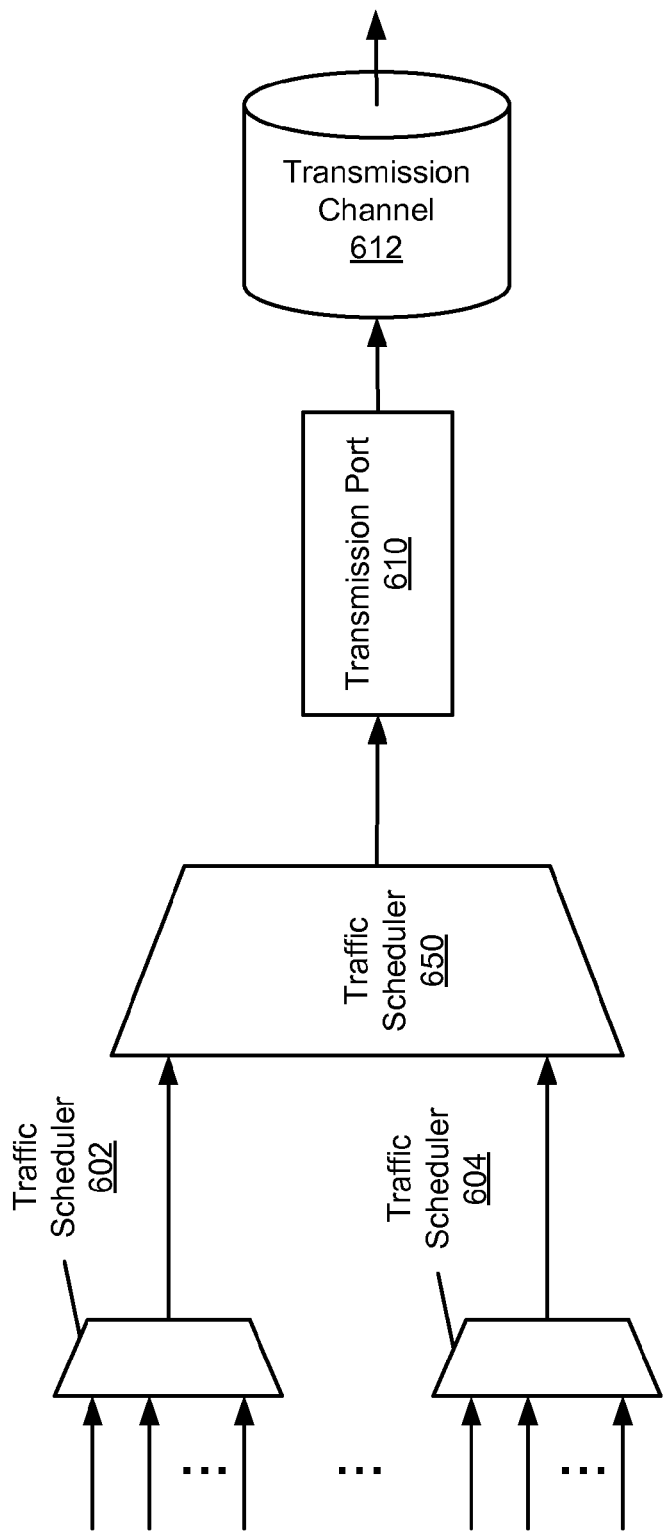
FIG. 6 is a block diagram illustrating a layered implementation of network devices implementing a method of enhanced traffic transmission according to one embodiment of the invention.

FIG. 6 is a block diagram illustrating a layered implementation of network devices implementing a method of enhanced traffic transmission according to one embodiment of the invention. Multiple network devices serve as traffic schedulers for transmission port 610. Packets arrive at traffic schedulers 602 and 604. Traffic schedulers 602 and 604 are set to ON or OFF depending on a variety of factors such as whether a timer has expired, a congestion level has reached a congestion threshold, a high priority packet has been detected, or a burst accumulation counter has reached an accumulation threshold. The packets output from traffic schedulers 602 and 604 are not forwarded directly to transmission port 610. Instead, they are forwarded to another scheduler, traffic scheduler 650, which is set to ON or OFF depending on the factors similar to that of traffic schedulers 602 and 604. The packets output from traffic scheduler 650 are then forwarded to transmission port 610 and transmitted to transmission channel 612. Transmission at transmission port may comply with IEEE 802.3az standards for Energy-Efficient Ethernet. Transmission channel 612 may be a radio frequency channel (wireless), a copper line, a power line, and other suitable medium for communication (e.g., fluid, gas, or solid molecule vibration or motion), depending on implementation. Note while two levels of traffic scheduling is illustrated, many more levels of traffic scheduling with a set of traffic schedulers at each levels can be implemented using the principle disclosed herein.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

The operations of the flow diagram are described with reference to the exemplary embodiment of FIG. 5. However, it should be understood that the operations of flow diagram 4 can be performed by embodiments of the invention other than those discussed with reference to FIG. 5, and the embodiments discussed with reference to FIG. 5 can perform operations different than those discussed with reference to the flow diagrams of FIG. 4.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

In addition, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network, wherein the network contains a plurality of network devices, wherein at least one network device providing traffic scheduling function to schedule transmission of packets, the method comprising:
   in response to arrival of a packet,
      determining whether a timer has expired;
      determining whether a congestion level has reached a congestion threshold;
      determining whether the packet is a high priority packet; and
      determining whether a burst accumulation counter has reached an accumulation threshold; and
      transmitting the packet along with any packet waiting for transmission, in response to the determination that at least one of conditions is satisfied:
         the timer has expired;
         the congestion level has reached the congestion threshold;
         the packet is a high priority packet; and
         the burst accumulation counter has reached the accumulation threshold; and
   in response the determination that:
      the timer has not expired;
      the congestion level has not reached the congestion threshold;
      the packet is not a high priority packet; and
      the burst accumulation counter has not reached an accumulation threshold,
   accumulating the burst accumulation counter;

keeping the timer running; and
keeping the packet in waiting for transmission.

2. The method of claim 1, further comprising transmitting packets arrived while the packet and the any packet waiting for transmission are being transmitted.

3. The method of claim 1, further comprising:
in response to completion of transmitting the packet along with any packet waiting for transmission,
resetting the timer; and
resetting the burst accumulation counter.

4. The method of claim 1, wherein the packet is transmitted ahead of any packet waiting for transmission in response to the determination that the packet is a high priority packet.

5. The method of claim 1, wherein the congestion threshold is configurable and dynamically adjustable, wherein a dynamic adjustment is at least partially based on priority of packets.

6. The method of claim 1, wherein the accumulation threshold is configurable.

7. The method of claim 1, wherein the timer is configurable.

8. The method of claim 1, wherein transmissions of packet within the network complies with IEEE 802.3az standards for Energy-Efficient Ethernet.

9. A network device serving as a traffic scheduler of a network to schedule transmission of packets, the network device comprising:
a traffic transceiver configured to receive and transmit packets;
a traffic buffer configured to store packets waiting for transmission; and
a scheduling processor configured to schedule transmission of a received packet, the scheduling processor comprising:
a scheduler register configured to trigger transmission of the received packet along with the packets stored in the traffic buffer when the scheduler register is set to be on;
a timer configured to time a duration, wherein an expiration of the timer triggers the scheduler register turning on;
a congestion determinator configured to determine whether a congestion level reaches a congestion threshold, wherein a determination that the congestion level has reached the congestion threshold triggers the scheduler register turning on;
a traffic priority determinator configured to determine whether the received packet is a high priority packet, wherein a determination that the received packet is a high priority packet triggers the scheduler register turning on;
a burst accumulation counter configured to determine whether a burst accumulation counter has reached an accumulation threshold with the received packet included, wherein a determination that the burst accumulation counter has reached the accumulation threshold triggers the scheduler register turning on; and
a database configured to store values of the congestion threshold and the accumulation threshold.

10. The network device of claim 9, wherein the received packet is to be stored in traffic buffer in response to the scheduler register stays off.

11. The network device of claim 9, the traffic transceiver further configured to transmit packets arrived while the traffic transceiver transmitting packets.

12. The network device of claim 9, wherein the timer and the burst accumulation counter are reset in response to transmitting the received packet.

13. The network device of claim 9, wherein the received packet is transmitted ahead of the packets within traffic buffer.

14. The network device of claim 9, wherein the congestion threshold is configurable and dynamically adjustable, wherein a dynamic adjustment is at least partially based on priority of packets.

15. The network device of claim 9, wherein the accumulation threshold is configurable.

16. The network device of claim 9, wherein the timer is configurable.

17. The network device of claim 9, wherein transmissions of packet within the network complies with IEEE 802.3az standards for Energy-Efficient Ethernet.

18. A method implemented in a network, wherein the network contains a plurality of network devices, wherein at least one network device providing traffic scheduling function to schedule transmission of packets, the method comprising:
in response to arrival of a packet,
determining whether a timer has expired;
determining whether a congestion level has reached a congestion threshold;
determining whether the packet is a high priority packet; and
determining whether a burst accumulation counter has reached an accumulation threshold; and
transmitting the packet along with any packet waiting for transmission, wherein the packet is transmitted ahead of any packet waiting for transmission, in response to the determination that at least one of the conditions is satisfied:
the timer has expired;
the congestion level has reached the congestion threshold;
the packet is a high priority packet; and
the burst accumulation counter has reached the accumulation threshold[H]
keeping the packet in waiting for transmission in response to the determination that:
the timer has not expired;
the congestion level has not reached the congestion threshold;
the packet is not a high priority packet; and
the burst accumulation counter has not reached an accumulation threshold;
accumulating the burst accumulation counter; and
keeping the timer running.

19. A traffic scheduler of a network to schedule transmission of packets, the traffic scheduler comprising:
a traffic transceiver configured to receive and transmit packets;
a traffic buffer configured to store packets waiting for transmission; and
a scheduling processor configured to schedule transmission of an received packet, the scheduling processor comprising:
a scheduler register configured to triggers transmission of the received packet along with the packets stored in the traffic buffer when the scheduler register is set to be on;
a timer configured to time a duration, wherein an expiration of the timer triggers the scheduler register turning on;
a congestion determinator configured to determine whether a congestion level has reached a congestion threshold, wherein a determination that the congestion level has reached the congestion threshold triggers the scheduler register turning on;

a traffic priority determinator configured to determine whether the received packet is a high priority packet, wherein a determination that the received packet is a high priority packet triggers the scheduler register turning on;

a burst accumulation counter configured to determine whether a burst accumulation counter has reached an accumulation threshold with the received packet included, wherein a determination that the burst accumulation counter has reached the accumulation threshold triggers the scheduler register turning on; and a database configured to store values of the congestion threshold and the accumulation threshold.

* * * * *

UNITED STATES PATENT AND TRADEMARK OFFICE
CERTIFICATE OF CORRECTION

PATENT NO.        : 9,160,665 B2                                           Page 1 of 1
APPLICATION NO.   : 13/870840
DATED             : October 13, 2015
INVENTOR(S)       : Anand It is certified that error appears in the above-identified patent and that said Letters Patent is hereby corrected as shown below:

Claims

In Column 14, Line 39, in Claim 18, delete "threshold[H]" and insert -- threshold; --, therefor.

Signed and Sealed this
Fifteenth Day of March, 2016

Michelle K. Lee
*Director of the United States Patent and Trademark Office*